United States Patent Office 2,992,236
Patented July 11, 1961

2,992,236
PREPARATION OF CITRACONIC ANHYDRIDE
Abraham Bavley, Brooklyn, N.Y., Marshall F. Humphrey, Fanwood, N.J., and Charles J. Knuth, Flushing, N.Y., assignors to Chas. Pfizer & Co., Inc., New York, N.Y., a corporation of Delaware
No Drawing. Filed July 29, 1957, Ser. No. 674,582
1 Claim. (Cl. 260—346.8)

This application is concerned with a new useful process for the production of citraconic anhydride.

Anhydrides are useful compounds for curing epoxy resins. Their use is fully described by Schildknecht in Polymer Processes, Interscience Publishing Co., New York, 1956, pages 444–447. Epoxy resins are a relatively new class of polymers which have found extensive use in various polymer applications as coatings, adhesives and as molded products. They are particularly useful in capsulating delicate electronic circuits to insulate and strengthen them.

Epoxy resins have chemical and physical properties which make them extremely desirable in these applications. They can be prepared in various physical forms ranging from viscous syrups to extremely hard solids. They have excellent adhesive strength and have relatively low shrinkage during the curing operation.

Curing is a well known process which is applied to resinous materials to enhance their hardness and heat resistance. Anhydrides, specifically, are used in the curing of epoxy resins to form cross-linked three dimensional polymers of increased hardness. In this process the anhydride is contacted with the resin and a catalytic amount of a tertiary amine, for example, benzyl-dimethylamine at a temperature of from about 25° C. to 120° C. until a hard glassy polymer results. Citraconic anhydric, when used in this process, is known to produce useful products.

Heretofore, citraconic anhydride has been prepared by maintaining itaconic acid at an elevated temperature so as to eliminate a molecule of water and to form the desired product which is isolated by rapid distillation at atmospheric pressure. This method has been found successful with only certain samples of refined, i.e. highly purified itaconic acid, while with other apparently identical samples of refined itaconic acid, a mildly exothermic side reaction is observed to occur accompanied by extensive tar formation and serious reduction in yield.

It is further found that when less expensive, less highly refined samples of itaconic acid, for example, the commercial "technical grade" are utilized in this reaction very low yields and extensive tar formation result.

Highly purified, refined itaconic acid can be characterized by its melting point (167–168° C.), its neutralization equivalent (65) or its bromine number (160). These latter two figures are the theoretical values and many refined products will have values varying slightly from these. Technical grade itaconic acid is generally lower melting, and melts over a range of temperature. Its neutralization equivalent and bromine number may vary quite considerably from those given above.

It will be appreciated that problems of this nature are of a special concern in industrial production where financial considerations require that a high yield be obtained, or that at least the yield must be reproducible in order to operate the process profitbaly.

The process of the instant invention, provided certain conditions are met, makes it possible to produce citraconic anhydride in high, reproducible yield using the technical grade of itaconic acid, and is, therefore, a useful advance in the arts.

In operating the process of the instant invention, itaconic acid is heated at a pressure below atmospheric, generally at a pressure of from about 20 mm. of mercury to about 500 mm. of mercury. It is best not to operate at a pressure below 20 mm., because below this pressure there is some tendency for the itaconic acid to sublime. The preferred operating pressure is from about 100 mm. of mercury to about 300 mm. of mercury since at this pressure the maximum yields are obtained.

The temperature employed will vary with the pressure, generally speaking, the lower the pressure the lower the operating temperature. The temperature may vary from about 155° C. to about 185° C. It is best to carry out the process at the temperature at which the citraconic anhydride boils at the selected pressure. In the preferred pressure range, this is from about 165° to about 175° C.

The best mode of operating the process of the instant invention employs a vacuum system with a still pot, preferably with a means of agitating the contents, a condenser with a fraction cutter at the receiving end and a number of interchangeable receivers. The itaconic acid is placed in the still pot and melted. It is desirable, but not necessary to stir the acid while it be being melted to insure proper heat transfer. When the acid is melted, or even before if desired, the system is evacuated to the chosen pressure and sufficient heat is applied to bring about the reaction. The correct temperature will be readily apparent by the appearance of water in the condenser and fraction cutter. When most of the water has distilled over citraconic anhydrate will start to collect in the fraction cutter. Its presence will be manifested by the appearance of two layers in the fraction cutter. At this point, the water and a small amount of citraconic is removed from the fraction cutter and the balance of the citraconic anhydride is collected.

Table I strikingly illustrates the advantages of the instant process. It will be noted that the first two runs both of which were carried out at atmospheric pressure gave yields which were substantially below the yields obtained in the last two runs. This is true even though the itaconic acid used in the first two runs was of the refined type and the itaconic acid used in the last run was technical grade. It will be noted also that the yield in run number two is 38% below that of run number one even though both runs were carried out at atmospheric pressure under substantially similar conditions.

TABLE I

| Run No. | Grade of Itaconic Acid | Pressure, mm. | Maximum Still Temp., ° C. | Yield, percent |
|---|---|---|---|---|
| 1 | refined | 760 | 234 | 69 |
| 2 | do | 760 | 247 | 31 |
| 3 | do | 111–26 | 174 | 85 |
| 4 | technical | 112–35 | 170 | 75 |

The following examples are given by way of illustration only and are not intended as limitations of this invention many variations of which are possible without departing from the spirit or scope thereof.

Example 1

A three necked round bottom flask equipped with a sealed stirrer, a sealed thermometer and a distillation condenser having a fraction cutter at the receiving end was prepared. The system was attached to a vacuum line. Technical grade itaconic acid, 200 g. was placed in the flask, the system was evacuated to 20 mm. of pressure and the temperature raised to 165° C. The melt was stirred while a small forerun of water and citraconic anhydride was collected and discarded. Distillation was continued at a pressure of 20 mm. of mercury and a 75% yield of citraconic anhydride was obtained.

Example II

The process of Example I was repeated at 185° C. and 500 mm. of mercury pressure to obtain a 60% yield of citraconic anhydride.

Example III

The process of Example I was repeated at 175° C. and 120 mm. of mercury pressure to obtain a 90% yield of citraconic anhydride.

Example IV

The process of Example I was repeated, except that the stirrer was omitted, at 165° C. and 100 mm. of mercury pressure to obtain an 85% yield of citraconic anhydride.

Example V

The process of Example I was repeated at atmospheric pressure and the temperature raised to a maximum 230° C. Copious amounts of tar remained in the flask and a 15% yield was obtained.

What is claimed is:

A process for preparing citraconic anhydride which comprises heating itaconic acid at a temperature of from about 165° C. to about 175° C. at a pressure from about 100 mm. of mercury to about 300 mm. of mercury, condensing and removing by-product water as an overhead fraction, and then collecting and removing citraconic anhydride as an overhead fraction.

References Cited in the file of this patent

UNITED STATES PATENTS

| | | |
|---|---|---|
| 2,088,347 | Scheuing et al. | July 27, 1937 |
| 2,258,947 | Crowell | Oct. 14, 1941 |
| 2,509,873 | McAteer | May 30, 1950 |

OTHER REFERENCES

Shriner et al.: Organic Synthesis Collective, vol. 2, pp. 140–141 (1943), John Wiley and Sons, Inc., publishers.